United States Patent Office 3,135,684
Patented June 2, 1964

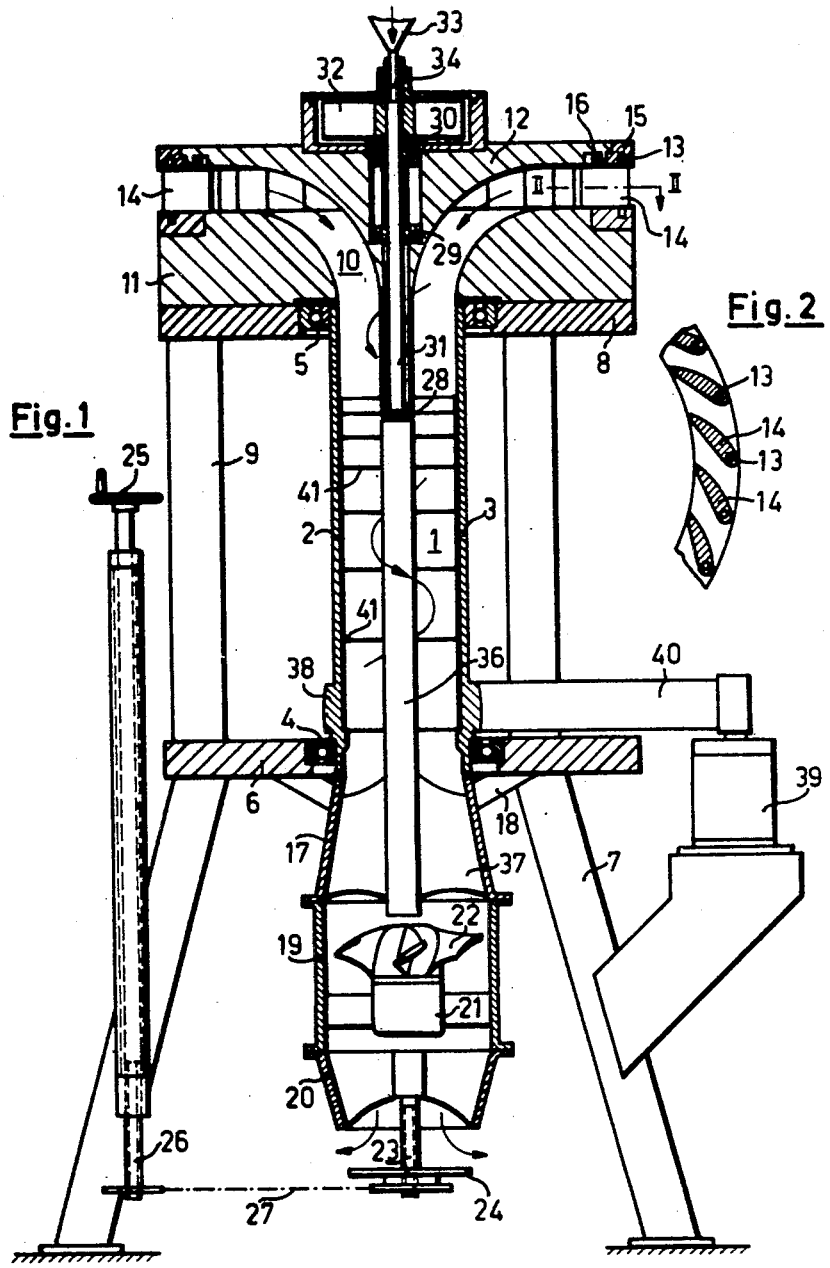

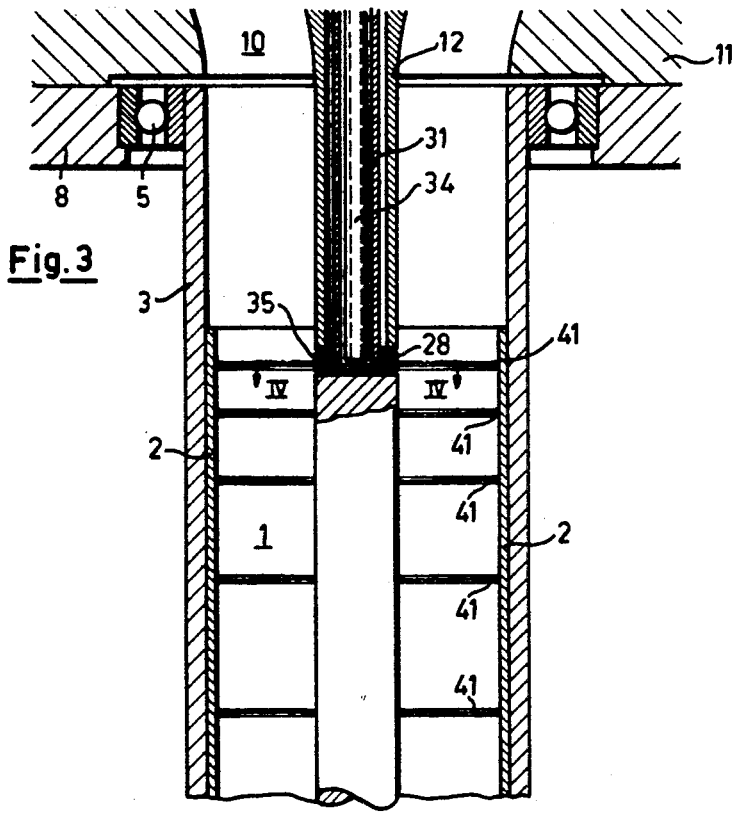
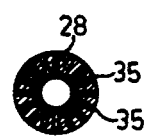

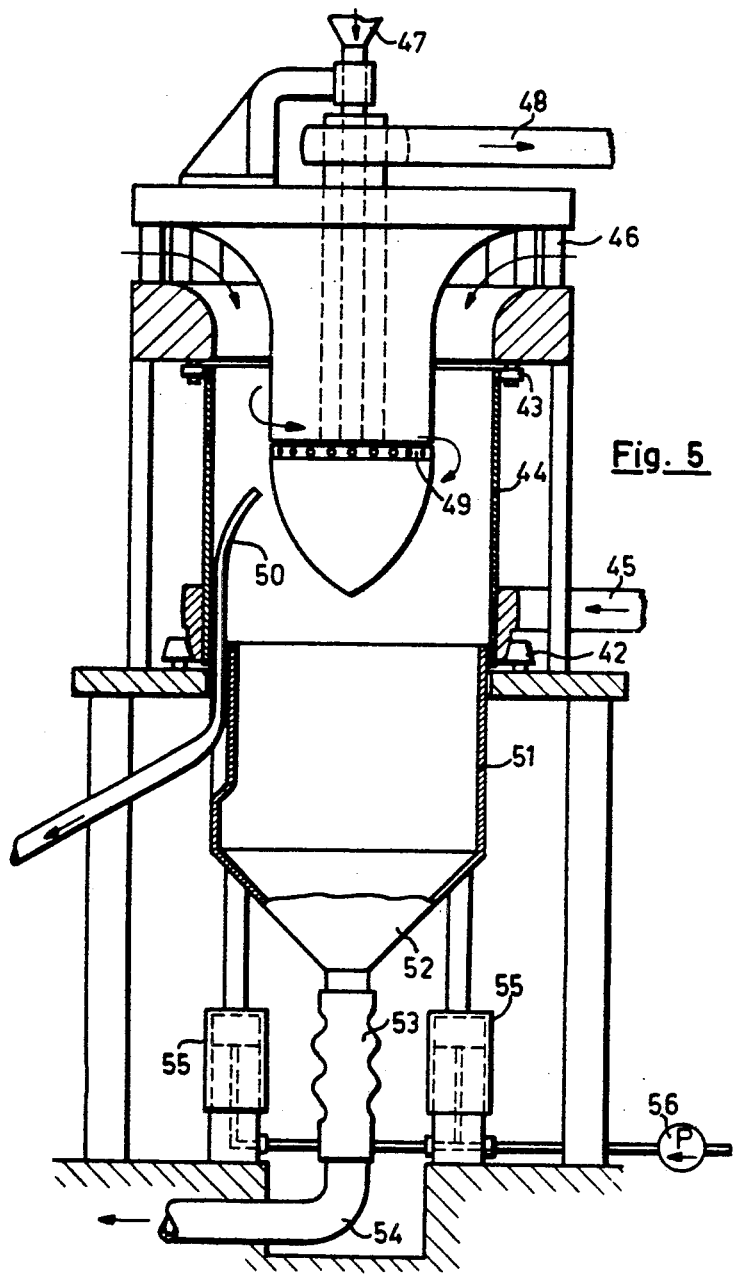

3,135,684
SEPARATING PULVEROUS OR GRANULAR
MATERIAL FROM A CARRIER MEDIUM
Jakob Ackeret, Kusnacht, Zurich, and Walter Wieland,
Niederlenz, Aargau, Switzerland, assignors to Cementfabrik Holderbank-Wildegg A.-G., Holderbank,
Aargau, Switzerland, a corporation of Switzerland
Filed Dec. 30, 1959, Ser. No. 862,902
Claims priority, application Switzerland Mar. 9, 1959
11 Claims. (Cl. 209—144)

This invention relates to a method for separating from a gaseous or liquid carrier medium pulverous or granular material suspended therein and an apparatus for carrying out the method.

Hitherto, the separation of material from a carrier medium has been effected by sedimentation, by cyclone separators or by centrifugal air separators with distributor plate feed. Centrifugal air separators with a helical air flow inside a vertically disposed hollow cylinder are known, in which the material is fed by means of a distributor plate to the upwardly travelling air stream. The coarse material which is centrifuged off is intercepted by the wall of the cylinder and falls downwardly therefrom, while the fine material is discharged upwardly by the air. A sharp separation between coarse material and fine material at a predetermined grain size is not possible in such a case, because flows transversely of the wall surface and eddies are set up with this known construction of the centrifugal air separator.

In a process for separating pulverous or granular material from a gaseous or liquid carrier medium, in which the latter is conveyed with a helical motion through a separating chamber, which is defined from outside by a substantially cylindrical casing or jacket designed to intercept the material separated out, an improvement in the separation sharpness between coarse material and fine material is now obtained in accordance with the invention by the fact that the casing or jacket of the separation chamber is kept in rotation unidirectionally with the helical motion of the stream of the carrier medium.

The invention is based on the knowledge that the transverse movements in the stream of carrier medium with the prior known arrangements are mainly due to the fact that the rotational movement of those particles of the carrier medium stream which are near the wall is arrested and always particles of higher energy content penetrate from inside into the boundary layer. The turbulence of the flow is thus increased and the material centrifuged on to the wall can thereby be whirled up again. However, due to the fact that, with the process of the invention, the wall of the separating chamber is kept rotating unidirectionally with the helical movement of the stream of carrier medium, the said increase in turbulence is avoided and a stable flow is obtained. Furthermore, those particles of the material being separated which are centrifuged on to the wall maintain their rotational movement and are pressed by centrifugal action on to the wall.

The drawing illustrates constructional examples of an apparatus for carrying out the method of the invention, by reference to which the method is for example also explained.

In the drawings:
FIG. 1 is a vertical section through a construction which can be used mainly as a laboratory air sifter.
FIG. 2 is a section on the line II—II of FIG. 1.
FIG. 3 shows a part of FIG. 1 to a larger scale.
FIG. 4 is a section on the line IV—IV of FIG. 3; and
FIG. 5 is a vertical section through a construction to be used mainly as an industrial air separator.

The arrangement shown in FIGS. 1 to 4, comprises a separating chamber 1, which is defined externally by a cylindrical wall or jacket 2. This jacket is constructed as a thin-walled tubular member and is fitted so that it can be replaced into a cylindrical hollow body 3, which is mounted to rotate about a vertical axis in ball bearings 4 and 5. The ball bearing 4 is mounted in a lower plate 6 of a stand 7, and the ball bearing 5 in an upper plate 8, which is connected by vertical struts 9 to the lower plate 6.

Atmospheric air is supplied as a carrier medium to the separating chamber 1 from above through an annular chamber 10, which is defined on one side by an annular member 11 mounted on the plate 8 and on the other side by a central body of revolution 12.

Positioned in the annular chamber or inlet duct 10 is a guide apparatus having guide vanes 14 which are rotatable about pivots 13 and which are constructed in the manner of the adjustable vanes of guide devices in water turbines. Any known adjustment mechanisms can be provided for the joint adjustment of the guide vanes. For the sake of simplicity, it is assumed here that the central body of revolution 12 is mounted in an external ring 15 for rotation about its axis by means not shown, and that the guide vanes engage with pins 16 in slots of the said body 12. With this arrangement, all of the guide vanes 14 are repositioned simultaneously as body 12 is angularly displaced.

The guide vanes 14 impart to the entering air a swirling movement which is counterclockwise when seen from above. After deflection into the axial direction, whereby the velocity is increased owing to the reduction in cross-section, the air then flows in a helical path through the separating chamber 1.

Adjoining the rotatable hollow body 3 below the separating chamber 1 is a discharge duct comprising a fixed tubular section 17 which increases in diameter and which is connected by ribs 18 to the lower plate 6. This tubular section 17 is further extended by a cylindrical tubular section 19 and a narrowing tubular section 20. Serving to convey the stream of air is a fan 22 which is installed in the tubular section 19 and driven by a motor 21. The air flow is regulated by a throttle plate 24 mounted on a threaded spindle 23 at the outlet end of the tubular section 20, which throttle plate can be rotated and thus displaced axially by a threaded spindle 26 adjustable by a hand wheel 25 and a chain drive 27.

The material to be air-separated is supplied by way of a distributor plate 28 into the stream of carrier medium, the said plate being arranged at the inlet end of the separating chamber 1 and coaxially of the latter. This distributing plate 28 is fixed to the bottom end of a tube 31 mounted coaxially of the separating chamber 1 in the central body 12 by means of ball bearings 29, 30 and is rotated unidirectionally with the stream of carrier medium. The drive is effected by a turbine wheel 32 which is mounted on the upper end of the tube 31 and which is set in rotation by means not further described, for example by compressed air.

The material to be separated is fed into a hopper 33 and is introduced through a fixed pipe 34 extending coaxially through the tube 31 into the interior of the rotating distributor plate 28. The latter is formed with radially extending holes 35, through which now the material to be treated discharges with simultaneous rotation into the stream of carrier medium. Adjoining the underside of the distributor plate 28 is a fixed central rod 36 of substantially the same diameter, this rod being fixed in the tubular section 17 by ribs 37. The coarse-grained fractions of the material introduced into the stream of carrier medium quickly cover the distance to the jacket 2, so that they already impinge on the said jacket 2 a short distance below the distributor plate 28. However, the finer the grain of the material, the longer time is taken for it to cover this distance and thus the further it is carried by the air stream moving downwardly with a helical movement before it impinges on the jacket 2. The material collected on the jacket is thus classified axially according to grain size.

In order however to avoid a harmful turbulence in the stream of carrier medium, which would lead to intermixing of the different grain fractions, the casing or jacket 2 defining the outside of the separating chamber is kept in rotation in the same direction as the helical movement of the carrier medium. For this purpose, the hollow body 3 carrying the jacket 2 is formed near the bearing 4 as a belt pulley 38. It is driven from an electric motor 39 by a belt 40 running over the pulley 38. Owing to the co-rotation of the jacket 2 in the same direction as the helical motion of the carrier medium, slowing down of the rotational movement of the carrier medium on the outside wall of the separating chamber is avoided and a stable flow with low turbulence is obtained. Moreover, the separated particles adhere satisfactorily to the interior surface of the jacket 2 owing to their centrifugal force, so that there is little danger of these particles being able to be entrained again by the carrier medium. There is thus produced on the jacket 2 a clean classification of the collected material according to grain size.

In order to subdivide the collected material into certain ranges of grain size, the jacket 2 is provided on the inside with a series of axially spaced rings 41 provided with sharp edges. Separated material of a certain range in the grain size will then be collected between two successive rings. It is advisable to design rings 41 so that they can be displaced longitudinally of the jacket 2. In this way, the longitudinal extent of the regions defined by adjacent rings 41 can be modified at will by removing jacket 2 from cylindrical body 3 and manually shifting the rings 41 in the longitudinal direction.

The arrangement described is advantageously adapted to be used as a laboratory air sifter. After starting up the apparatus, a sample of the material to be investigated is fed into the hopper 33. The quantity introduced is then distributed according to grain size on the rotating jacket 2. The device is then switched off and after removing the body 12, the jacket 2 is extracted, and analysis according to grain size is obtained after weighing out the material deposited between the individual rings 41.

The adjustability of the guide vanes 14 makes it possible for the ratio between rotational speed of the carrier medium and its axial speed in the separating chamber to be chosen in the manner suitable for the material to be investigated. As regards the driving motor 39, this is preferably an infinitely variable motor in order to be able to adapt the rotational speed of the jacket 2 to the rotational speed of the carrier medium.

The apparatus shown in FIG. 5 is designed advantageously for use as an industrial air separator. The separating chamber is defined externally by a cylindrical jacket 44 which is mounted in rollers 42 and 43 and which is driven by means (not shown) through a belt 45. The carrier medium, atmospheric air, is again supplied by a guide device 46, which imparts a rotational movement to it, into the separating chamber, which it then flows through with a helical movement. The jacket 44 again rotates in the same direction as the rotational movement of the carrier medium. The material to be separated is supplied to a hopper 47 and is introduced by a rotating distributor plate 49 driven by a belt drive 48 into the stream of carrier medium.

In contrast to the construction according to FIGS. 1 to 4, however, the material intercepted by the wall or jacket 44 is not retained, but is continuously discharged by a fixed stripper device 50. The stripper device 50 consists of a tube which is guided helically along the internal surface of the jacket 44. It is slotted longitudinally in this region, whereby the free edge serves as a scraper and conveys the material stripped from the jacket 44 into the interior of the tube, through which it is then discharged.

In this construction, the separating chamber is comparatively short axially, since it is not intended completely to separate the material from the carrier medium. The fine material is in fact carried along with the carrier medium. After leaving the separating chamber, the said medium flows through discharge duct comprising a cylindrical casing 51 which is connected coaxially beneath the said chamber and the lower funnel-shaped end 52 of which is connected by a flexible hose 53 to a pipe 54. Serving to convey the carrier medium is a fan (not shown), which can for example be connected to the pipe 54 through filter bags serving to separate out the fine material.

In order to enable coarse material of a smaller or larger grain range to be intercepted at will by the jacket 44 and discharged by the scraper 50, the cylindrical casing 51 forming a tubular end portion of the discharge duct is made with only a slightly smaller diameter than the jacket 44 of the separating chamber and is arranged to project into the rotatable tubular member, i.e., the jacket 44, and to be displaceable axially inside the jacket 44. For this purpose, it is mounted on supports 55 which can be adjusted vertically by hydraulic means. By supply of medium under pressure through a pump 56 to these supports, the cylindrical jacket 51 can be raised as desired, so that only a smaller fraction of coarse material is collected by the rotating jacket 44, but instead fine material of a larger grain size range is discharged into the pipe 54. The arrangement makes it possible for a large quantity of material to be separated into two fractions.

In the constrction according to FIG. 5, instead of only one stripper device, it is possible to provide two or more stripper devices for different zones of the rotating outer jacket of the separating chamber. By this means, it also becomes possible here to subdivide the material collected on the jacket into different fractions.

As well as for a carrier medium in gaseous form, the device described can also be used for a liquid carrier medium. Instead of the carrier medium being extracted by suction on the outlet side of the device, as previously described, it can also be introduced by conveyor means arranged on the inlet side and by superatmospheric pressure into the apparatus.

What is claimed is:

1. A method for classifying pulverous or granular material comprising the steps of guiding a stream of a carrier medium through the interior of a substantially cylindrical jacket in the axial direction thereof; imparting to the stream entering said jacket a rotational movement about the axis of the jacket so as to cause the said stream to traverse the interior of the jacket with a helical motion; admixing the material to be classified with the helically moving stream at a point spaced radially from the jacket and located near the entrance of the stream into the jacket; revolving said jacket about its axis in the same direction and at substantially the same speed as the stream of the carrier medium, whereby the material to be classified is deposited on the inner surface of said jacket axially in the order of particle size; and collecting the material which deposits in a longitudinally limited zone of the jacket having a length less than that of the jacket.

2. An apparatus for classifying pulverous or granular material comprising a substantially cylindrical jacket having an inlet and an outlet axially spaced from said inlet, said jacket defining between said inlet and outlet a separating chamber; bearing means arranged to support said jacket for rotation about its axis; motor means connected with said jacket for rotating it; means arranged at the inlet end of the jacket for supplying a whirling body of a carrier medium to said separating chamber so that the medium passes axially through said chamber toward the outlet end of the jacket while having a rotational movement about the axis of the jacket in the same direction and at substantially the same rotary speed as the jacket; means arranged within the separating chamber for introducing the material to be classified to the whirling body of the carrier medium at a point located near the inlet of and spaced radially from the jacket, whereby the said material may settle on the interior surface of said jacket classified axially according to particle size; and means for collecting the material which deposits in a longitudinally limited zone of the jacket having a length less than that of the jacket.

3. The apparatus defined in claim 2 in which the means for supplying carrier medium comprises a stationary annular supply duct arranged axially adjacent the inlet end of the jacket, and a circular series of guide vanes arranged in said supply duct so as to impart the rotational movement to the carrier medium to be passed through the separating chamber.

4. The apparatus defined in claim 2 including a stationary discharge duct adjoining the outlet end of said rotatable jacket; and an adjustable throttling member for regulating flow through said discharge duct.

5. The apparatus defined in claim 2 in which said means for collecting the material includes longitudinally spaced removable collecting rings mounted in the rotatable jacket in close proximity to its inner surface.

6. The apparatus defined in claim 2 in which the jacket of the separating chamber comprises a hollow body supported by the bearing means and connected in driven relation with the motor means, and a thin-walled tubular member removably mounted within the hollow body.

7. The apparatus defined in claim 2 in which said means for collecting the material includes a non-rotary cylindrical casing located within the rotatable jacket at the outlet end thereof; means supporting the non-rotary casing for longitudinal movement within the rotatable jacket, whereby the length of the interior surface of the jacket on which material deposits may be varied; and a stripper device for continuously removing from the interior surface of the rotatable jacket the material which deposits thereon.

8. A centrifugal apparatus for sifting pulverous or granular material comprising a straight tubular member; means supporting the tubular member for rotation about a vertical axis; a stationary annular inlet duct leading to the upper end of said tubular member; a stationary discharge duct arranged axially adjacent the lower end of the said tubular member; said inlet duct, said tubular member and said discharge duct defining a flow path for a carrier medium for the said pulverous or granular material; propelling means arranged in said discharge duct for conveying the said carrier medium through said flow path; a guide apparatus, including an annular series of adjustable vanes, arranged in said inlet duct for imparting a swirling movement to the gaseous carrier medium before it enters the tubular member, so that the said medium passes with a helical movement through said tubular member; an adjusted throttling member located at the lower end of said discharge duct; means for distributing the material to be sifted into said carrier medium at a point near the upper end of the tubular member and spaced radially from the tubular member, said distributing means including a supply duct located in the center of the inlet duct and an adjoining rotary distributing disc; motor means drivingly connected with said tubular member so as to cause it to rotate unidirectionally with and at substantially the same speed as the throughflowing medium, the material separated out from the carrier medium being thereby collected on the interior surface of the tubular member and classified axially according to particle size, and at least one collecting ring mounted within and coaxially of the rotatable tubular member in close proximity to its interior surface, the ring being removable in the axial direction of said tubular member and serving to allow separate collection of the material deposited in a limited longitudinal zone of the tubular member.

9. A centrifugal apparatus for sifting pulverous or granular material comprising a straight tubular member; means supporting the tubular member for rotation about a vertical axis; a stationary annular inlet duct leading to the upper end of said tubular member; a nonrotary discharge duct arranged at the lower end of the said tubular member and having a tubular end portion projecting coaxially into the rotatable tubular member in close proximity to the inner surface thereof; said inlet duct, said tubular member and said discharge duct defining a flow path for a carrier medium for the said pulverous or granular material; a guide apparatus, including an annular series of vanes, arranged in said inlet duct for imparting a rotational movement to the throughflowing carrier medium before it enters the tubular member, so that the said medium passes with a helical movement through said tubular member; means for distributing the material to be sifted into said carrier medium at a point near said upper end of the tubular member and spaced radially from the tubular member, said distributing means including a supply duct located in the center of the inlet duct and an adjoining rotary distributing disc; motor means drivingly connected with said tubular member so as to cause it to rotate unidirectionally with and at substantially the same speed as the throughflowing carrier medium, material separated out from said carrier medium being thereby deposited on the interior surface of the tubular member; means supporting the discharge duct for movement in the longitudinal direction of the rotatable tubular member so as to define an adjustable lower limit of a zone of particle deposition on the interior surface of the rotatable tubular member; and a stripper device inside the rotatable tubular member in close proximity to the inner surface thereof so as to collect the deposited material in said zone and to separately discharge it downward.

10. The apparatus defined in claim 3 in which the guide vanes are adjustable.

11. The apparatus defined in claim 2 in which the means for introducing the material to be classified comprises a supply duct coaxial with the rotatable jacket; and a rotary distributing disc adjoining said supply duct.

References Cited in the file of this patent

UNITED STATES PATENTS

| | | |
|---|---|---|
| 424,042 | Watters | Mar. 25, 1890 |
| 582,318 | Shaw et al. | May 11, 1897 |
| 631,680 | Staahlgren | Aug. 22, 1899 |
| 980,001 | Ponten | Dec. 27, 1910 |
| 2,102,525 | Freeman | Dec. 14, 1937 |
| 2,113,885 | Gerhardt | Apr. 12, 1938 |
| 2,272,675 | Knudsen | Feb. 10, 1942 |
| 2,357,527 | Lundquist | Sept. 5, 1944 |
| 2,561,840 | Busquet | July 24, 1951 |
| 2,744,338 | Rothe | May 8, 1956 |
| 2,804,163 | Bullock et al. | Aug. 27, 1957 |
| 2,822,126 | Cohn | Feb. 4, 1958 |
| 2,947,471 | Beams et al. | Aug. 2, 1960 |
| 3,074,627 | Goetz | Jan. 22, 1963 |
| 3,092,583 | Wolff et al. | June 4, 1963 |
| 3,096,282 | Trotter | July 2, 1963 |

UNITED STATES PATENT OFFICE

CERTIFICATE OF CORRECTION

Patent No. 3,135,684                        June 2, 1964

Jakob Ackeret et al.

It is hereby certified that error appears in the above numbered patent requiring correction and that the said Letters Patent should read as corrected below.

Column 5, line 61, for "adjusted" read -- adjustable --.

Signed and sealed this 29th day of September 1964.

(SEAL)
Attest:

ERNEST W. SWIDER                            EDWARD J. BRENNER
Attesting Officer                               Commissioner of Patents